United States Patent
Bellegarde

(10) Patent No.: US 8,907,255 B2
(45) Date of Patent: Dec. 9, 2014

(54) METHOD FOR DEICING A POWER SUPPLY LINE FOR RAILWAY VEHICLES

(75) Inventor: Nicolas Bellegarde, La Varenne Saint-Hilaire (FR)

(73) Assignee: Alstom Transport SA, Levallois-Perret (FR)

(*) Notice: Subject to any disclaimer, the term of this patent is extended or adjusted under 35 U.S.C. 154(b) by 520 days.

(21) Appl. No.: 13/090,137

(22) Filed: Apr. 19, 2011

(65) Prior Publication Data

US 2012/0067850 A1 Mar. 22, 2012

(30) Foreign Application Priority Data

Apr. 19, 2010 (FR) ...................................... 10 52960

(51) Int. Cl.
*H05B 1/02* (2006.01)
*B60M 3/00* (2006.01)
*H02G 7/16* (2006.01)

(52) U.S. Cl.
CPC .. *B60M 3/00* (2013.01); *H02G 7/16* (2013.01)
USPC .......................................... 219/486; 219/209

(58) Field of Classification Search
USPC .................. 219/209, 213, 486, 537; 246/428; 104/279
See application file for complete search history.

(56) References Cited

U.S. PATENT DOCUMENTS

| | | | | |
|---|---|---|---|---|
| 743,331 A * | 11/1903 | Ries | ............................... | 219/213 |
| 4,082,962 A * | 4/1978 | Burgsdorf et al. | ............ | 219/209 |
| 4,119,866 A * | 10/1978 | Genrikh et al. | ............... | 219/209 |
| 4,126,792 A * | 11/1978 | Genrikh et al. | ............... | 219/209 |
| 4,135,221 A * | 1/1979 | Genrikh et al. | ............... | 219/209 |
| 4,190,137 A * | 2/1980 | Shimada et al. | ................ | 191/27 |
| 6,018,152 A * | 1/2000 | Allaire et al. | ................. | 219/485 |
| 6,727,470 B2 * | 4/2004 | Reichle | ......................... | 219/213 |
| 2009/0250449 A1* | 10/2009 | Petrenko et al. | ............. | 219/262 |
| 2010/0033028 A1* | 2/2010 | Sadek et al. | .................. | 307/149 |

FOREIGN PATENT DOCUMENTS

| | | |
|---|---|---|
| CN | 101 640 400 A | 2/2010 |
| DE | 103 37 937 A1 | 3/2005 |
| DE | 10337937 A1 * | 3/2005 |
| EP | 1619069 A1 * | 1/2006 |
| EP | 1 985 490 A1 | 10/2008 |
| EP | 1985490 A1 * | 10/2008 |

OTHER PUBLICATIONS

Machine translation of German Patend Doucment DE-10337937-A1, Oct. 2013.*
Preliminary Search Report and Opinion in French dated Dec. 8, 2010 issued for No. FR1052960 filed Apr. 19, 2010.

* cited by examiner

*Primary Examiner* — Geoffrey S Evans
(74) *Attorney, Agent, or Firm* — Knobbe Martens Olson & Bear LLP

(57) ABSTRACT

This method for deicing a direct current power supply line for railway vehicles is provided for a line extending between at least a first and a second reversible substations able to supply an electrical current circulating on the electrical power supply line, the first substation being controlled in a current supply mode, to supply an electrical current to the electrical power supply line and the second substation being controlled in a current recovery mode, to recover the electrical current from the electrical power supply line and send it back on an electrical power supply network. The method comprises establishing a voltage difference between the output terminals of the first and second substations such that a current circulates on the electrical power supply line between the two substations and that the heat produced by the circulation of the current causes the deicing of the power supply line between the two substations.

8 Claims, 2 Drawing Sheets

METHOD FOR DEICING A POWER SUPPLY LINE FOR RAILWAY VEHICLES

CROSS-REFERENCE TO RELATED APPLICATIONS

This application claims the benefit of French Application No. 10 52960 filed Apr. 19, 2010, which is hereby expressly incorporated by reference in its entirety.

BACKGROUND OF THE INVENTION

1. Field of the Invention

The present invention relates to a method for deicing a power supply line for railway vehicles, said line extending between at least a first and a second reversible substation able to supply an electrical current circulating on the electrical power supply line, the first substation being controlled in a current supply mode, to supply an electrical current to the electrical power supply line and the second substation being controlled in a current recovery mode, to recover the electrical current from the electrical power supply line and send it back on an electrical power supply network.

2. Description of the Related Art

In winter or in cold regions, a layer of ice frequently forms on the electrical power supply lines of railway vehicles. Yet the contact between a railway vehicle pantograph and such a layer of ice causes electric arcs to form or makes it impossible for the vehicle to capture current. Moreover, the power supply lines are likely to sink under the weight of this layer of ice or snow, paralyzing railway traffic. It is therefore important to be able to deice the electrical power supply lines or to prevent such layers of ice from forming so as to prevent disruptions in railway traffic.

To prevent layers of ice from forming on the power supply line, it is possible to have trains run on the concerned line at regular intervals, for example every hour, the contact between the pantograph and the power supply line preventing ice from forming on the power supply line.

Such a method is not fully satisfactory. Indeed, it requires in particular that trains be run empty all night for the sole purpose of preventing ice from forming, which incurs substantial costs.

To deice the power supply line, it is also possible to run a scraper train on the concerned line provided with special bows performing the deicing or to put the line in short-circuit by connecting it to the rail using an additional electronic system, for example including switches and resistors, to create an electrical current and keep it at a certain level.

Such methods are not fully satisfactory. They require the use of specific equipment, which is not usually present on the line. Furthermore, putting the electrical power supply lines in short circuit is risky for operators and the general population.

SUMMARY OF THE INVENTION

One aim of the invention is therefore to obtain a deicing method that is easy to use and inexpensive to carry out.

To that end, the invention relates to a deicing method of the aforementioned type, characterized in that it comprises a step of establishing a voltage difference between the output terminals of the first and second substations such that a current circulates on the electrical power supply line between the first substation and the second substation and that the heat produced by the circulation of the current causes the deicing of the power supply line between the first and second substations.

This method can be carried out without specific equipment and controlled remotely, which limits costs and makes maintenance easier on the line.

The method according to the invention can comprise one or more of the following features, considered alone or according to any technically possible combination:

the method comprises a step of choosing and controlling the voltage difference between the output terminals of the first and second substations;

the first substation and the second substation each comprise a reversible power converter, such that the first substation and the second substation are capable of operating in current supply mode or current recovery mode and the method comprises a step of controlling the operating mode of the first and second substations, in current supply mode and current recovery mode, respectively;

the reversible power converter comprises a rectifier and an inverter, connected to the rectifier in anti-parallel, and the first or the second substation operates in inverter mode when it is controlled in current recovery mode and in rectifier mode when it is controlled in current supply mode;

each substation is connected to the power supply line and to a rail such that the current circulates in a loop passing successively through the substation controlled in current supply mode, then through the power supply line, then through the substation controlled in current recovery mode, then through the rail to return to the substation controlled in current supply mode;

the method comprises a step of measuring the temperature on or near the power supply line, the voltage difference being established if the measured temperature is below a pre-established threshold;

the method comprises a step of checking if a railway vehicle circulates between the substations, the voltage difference being established if no railway vehicle is circulating between the first and the second substation; and the power supply line extending between more than two substations, the method comprises a step of choosing two substations to be controlled in current supply mode and current recovery mode, respectively, and a step of establishing a voltage difference between the output terminals of said substations depending on the segment of the line to be deiced.

BRIEF DESCRIPTION OF THE DRAWINGS

The invention will be better understood upon reading the following description, provided solely as an example, and done in reference to the appended drawings, in which.

DETAILED DESCRIPTION OF THE PREFERRED EMBODIMENT

The invention is applicable to a direct current power supply line for railway vehicles.

Figure 1:
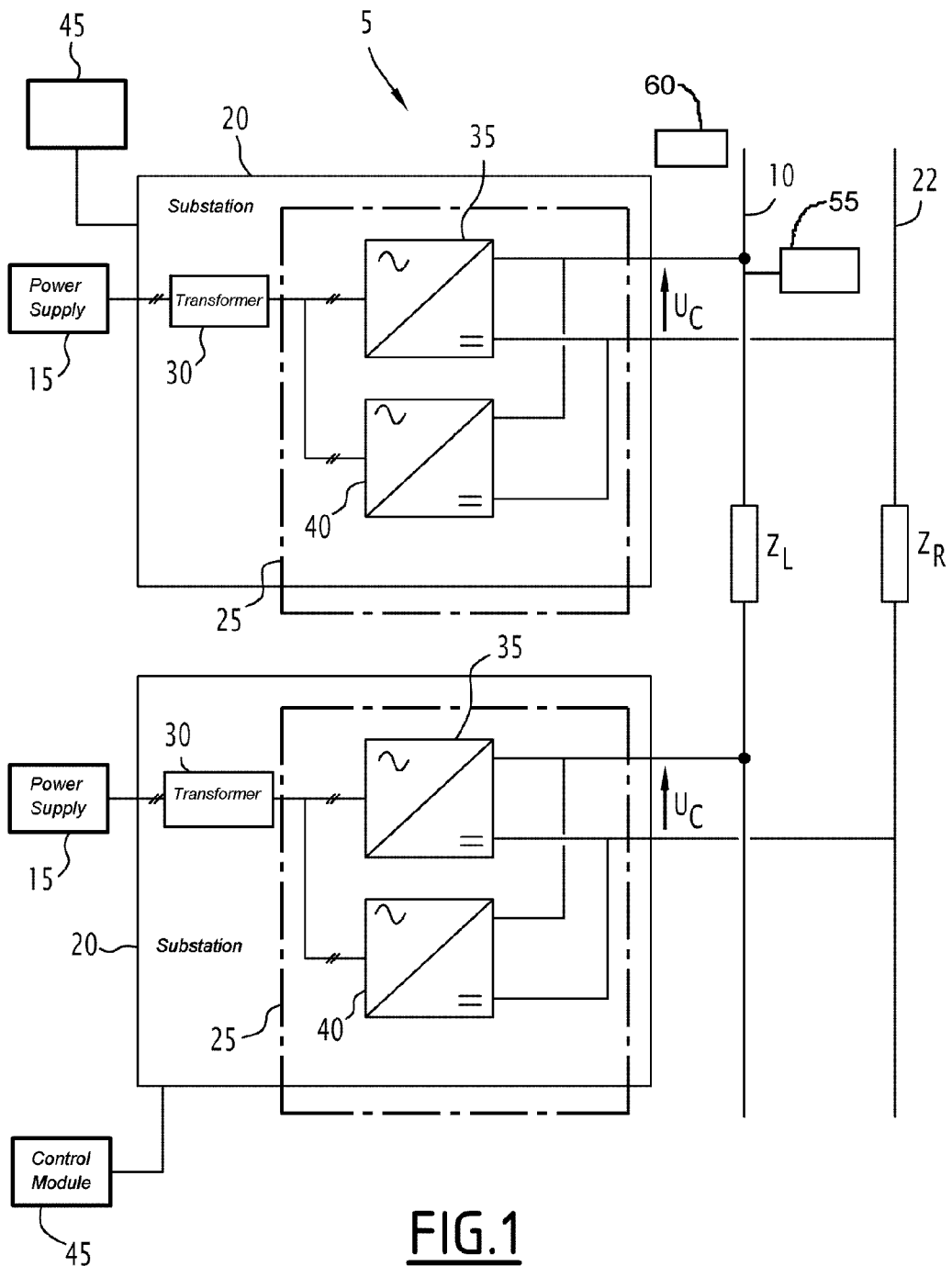
FIG. 1 is a diagrammatic illustration of a railway network equipped with substations able to carry out the deicing method according to the invention.

The direct current railway network 5 shown in FIG. 1 includes an electrical power supply line 10, connected to an electrical power supply network 15 via reversible substations 20.

"Reversible substation" refers to a substation able, in a current supply mode, to provide current to the electrical power supply line 10 and also able, in a current recovery mode, to recover current from said power supply line 10, the recovered current for example coming from the braking of a railway vehicle connected to the power supply line 10, and to return it on the electrical power supply network 15.

The railway network 5 includes a number n of reversible substations 20, distributed at regular intervals along the electrical power supply line 10. To simplify FIGS. 1 and 2, only two reversible substations 20 have been shown.

The railway network 5 also comprises a rail 22, on which a railway vehicle is able to travel. The rail 22 has a nominal linear impedance ZR, for example equal to 18 mΩ/km for a standard track with two parallel rails. This rail 22 is electrically connected to the reversible substations 20.

The electrical power supply line 10 has a nominal linear impedance ZL. This nominal linear impedance ZL is for example 0.05 Ω/km for direct current overhead contact lines and 0.02 Ω/km for direct current ground contact lines of the 3rd rail type. The value of the nominal linear impedance ZL of the electrical power supply line 10 is given by the specifications of the power supply line 10.

The electrical power supply network 15 is a wide area electrical power distribution system. It is for example a high-voltage three-phase alternating voltage system.

The reversible substations 20 are identical to each other and only one of these reversible substations 20 will be described in detail.

The reversible substation 20 includes a four-quadrant reversible power converter 25 connected on one side to the electrical power supply network 15 and on the other side to the power supply line 10.

A traction transformer 30 is arranged between the converter 25 and the power supply network 15, so as to lower the alternating voltage coming from the power supply network 15 to an alternating voltage accepted at the input of the converter 25.

The converter 25 is a reversible converter that can, for example, be made up of a rectifier 35, connected in anti-parallel to an inverter 40. The reversible converter 25 can operate in rectifier mode or inverter mode.

In rectifier mode, the converter 25 is able to rectify the three-phase alternating voltage coming from the traction transformer 30 to deliver, at its output, a rectified direct voltage. The converter 25 is thus in current supply mode.

In inverter mode, the converter 25 is able to invert the direct voltage coming from the power supply line 10 to deliver, at its output, an alternating three-phase voltage. The converter 25 is thus in current recovery mode.

The converter 25 is a controllable converter. To that end, the substation 20 includes a control module 45 able to control the switching of the converter 25 from the current recovery mode towards the current supply mode, i.e. from the inverter mode to the rectifier mode and vice versa.

The rectifier 35 is for example formed by a controlled rectifier bridge made from thyristors or power transistors such as IBGT transistors (Insulated Gate Bipolar Transistor).

In an alternative that is not shown, the rectifier 35 and the inverter 40 can be incorporated into the same equipment to form the reversible converter 25.

The reversible converter 25 is able to generate, at its output, i.e. at the electrical connection point of the substation 20 to the power supply line 10, a desired voltage UC.

Such a substation 20 is for example described in document EP-1 985 490.

Each substation 20 also includes a device for measuring the voltage UC at the output of the substation 20, this device being able to verify that the output voltage corresponds to the command voltage UC.

Moreover, the railway network 5 comprises, at each substation 20, a device for measuring the intensity I of the current circulating on the power supply line 10.

According to one alternative, the railway network 5 also includes one or more temperature sensors 55, adapted to measure the temperature of the electrical power supply line 10 or temperature sensors 60 adapted to measure the ambient temperature near the electrical power supply line 10.

The deicing method according to the invention will now be explained in reference to FIG. 2.

In a first step, the operator chooses a segment T of the power supply line 10 to deice.

He then determines, in a second step, the first substation 20A and the second substation 20B between which the segment T of the power supply line 10 selected in the first step extends. The first substation 20A and the second substation 20B are separated by a distance dAB. The first substation 20A and the second substation 20B are for example substations adjacent along the power supply line 10. They may, however, also be substations that are not adjacent and are separated from each other by a number of substations smaller than or equal to n−2. Thus, the first substation 20A and the second substation 20B can for example be the end substations of the electrical power supply line 10.

The operator then ensures that no railway vehicles are traveling on the segment T between the first substation 20A and the second substation 20B or are about to arrive at the first or second substation 20A, 20B.

In a third step, the operator chooses a deicing current I that he wishes to make circulate on the power supply line 10, as well as a duration for this current I to circulate on the power supply line 10.

He then deduces, from the chosen deicing current I, the corresponding output voltages UCA and UCB to be applied to the output of a first converter 25A of the first substation 20A and of a second converter 25B of the second substation 20B, respectively. The output voltages UCA and UCB are different from each other. The voltage UCA is higher than the voltage UCB.

In a fourth step, the operator controls, via a control module 45A of the first substation 20A, the operation of the converter 25A in current supply mode, i.e. in rectifier mode. At the same time, he controls, via a control module 45B of the second substation 20B, the operation of the converter 25B in current recovery mode, i.e. in inverter mode.

A voltage difference D is thus established between the outputs of the first substation 20A and the second substation 20B. This voltage difference D is equal to UCA−UCB. This voltage difference D is positive. It causes the circulation of a deicing current I on the power supply line 10 on the segment T between the first substation 20A and the second substation 20B.

This voltage difference D must remain below a maximum value defined by the standards in force. For example, for a direct current power supply line, the European standard requires a voltage difference D at most equal to 400 V for railway vehicles operating at 600V, 500V for railway vehicles operating at 750V, 1000 V for railway vehicles operating at 1500 V, and 2000 V for railway vehicles operating at 3000 V.

According to one embodiment, in a fifth step, the voltage sensor measures the voltage at the output of the first substation 20A and of the second substation 20B, so as to verify that this voltage is respectively equal to the command voltage UCA and UCB.

Figure 2:
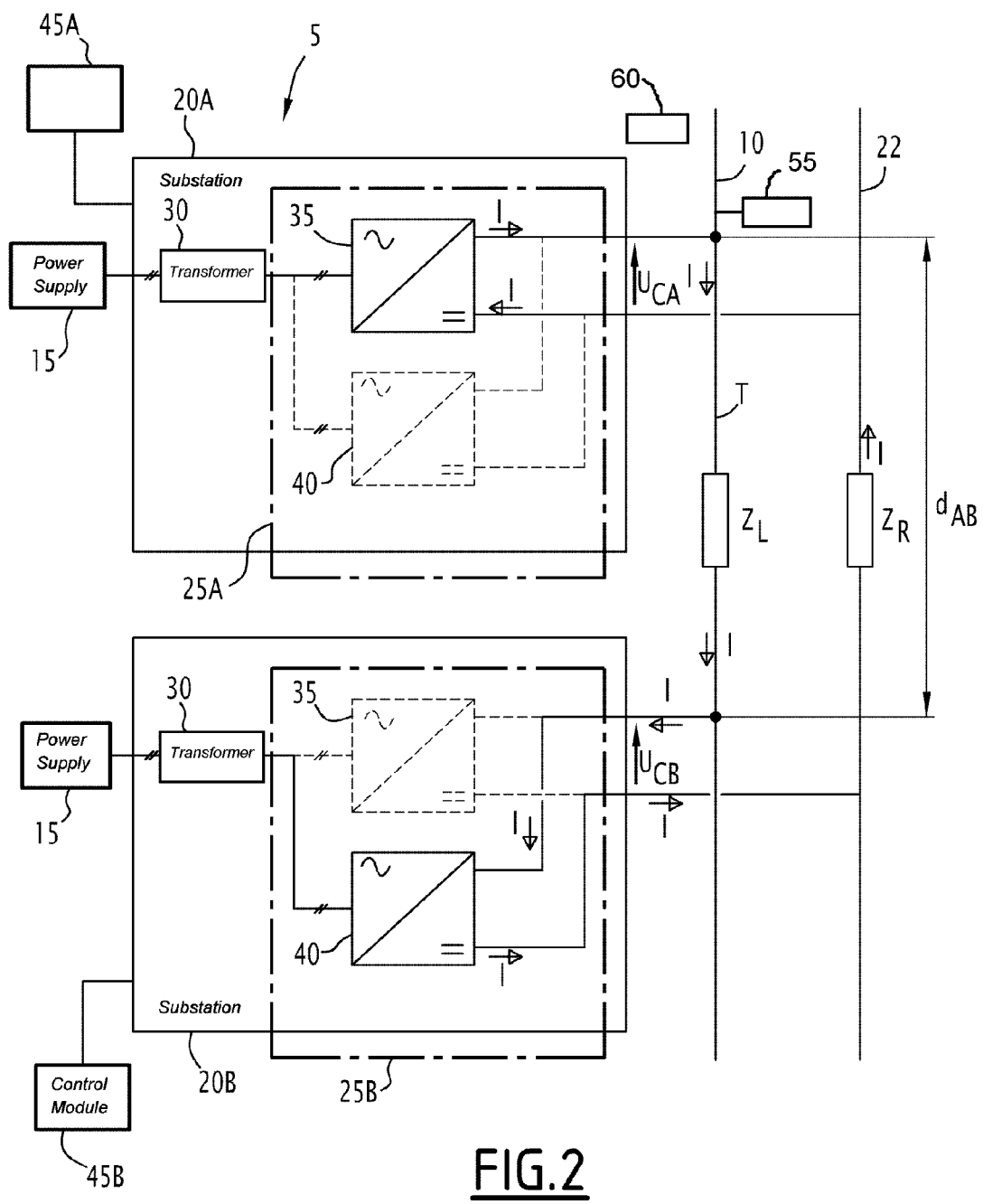
FIG. 2 is a diagrammatic illustration of the implementation of the inventive method by the railway network of FIG. 1.

Because of the electrical connection between the first and second substations 20A, 20B and the rail 22, the deicing current I describes a loop passing through the power supply line 10 from the first substation 20A towards the second substation 20B, i.e. over the segment T of the power supply line 10, then through the rail 22, from the second substation 20B towards the first substation 20A, as shown in FIG. 2.

The intensity I of the deicing current circulating in the power supply line 10 on the segment T is equal to:

$$I = \frac{[U_{CA} - U_{CB}]}{[Z_L + Z_R] \times d_{AB}} = \frac{D}{[Z_L + Z_R] \times d_{AB}}$$

where ZL is the nominal linear impedance of the power supply line 10, ZR is the nominal linear impedance of the rail 22, D is the voltage difference between the outputs of the first substation 20A and the second substation 20B, and dAB is the distance between the first substation 20A and the second substation 20B.

The value of the deicing current I is chosen so as to optimize the deicing effect, and in particular so as to make the deicing as fast as possible, while avoiding excessive heating of the power supply line 10, of a nature to damage it.

The value of the deicing current I depends in particular on climate conditions, the nature of the railway network 5, in particular whether it involves a subway, tramway, or main railway lines (inter-regional or international system), as well as the nature of the power supply line 10 and in particular the dimensions of the wire making up the power supply line 10, therefore the linear impedance ZL of the power supply line 10.

The deicing current I cannot be greater than a value Imax above which the power supply line 10 and/or the related equipment may be damaged. In the event deicing requires a current higher than Imax, for a given circulation time of the current I, the operator chooses a longer circulation time of the current I, so as to obtain an equivalent deicing effect without exceeding the maximum admissible current value Imax. According to one example, the circulation time can be between several minutes and several hours.

The circulation of the deicing current I causes heating by Joule effect in the power supply line 10 on the segment T where the current I passes, and thus melting of the ice and/or snow present on this segment T and therefore deicing thereof.

According to one embodiment, the deicing method according to the invention also comprises a step of measuring the temperature TL on the power supply line or the ambient temperature Ta near the line 10 using a suitable temperature sensor (such as sensor 50 or 60), the voltage difference D being established if the measured temperature TL or Ta is below a given pre-established threshold.

The method according to the invention is implemented remotely by an operator, who controls each step of the method, after deciding, depending in particular on weather conditions, whether deicing is useful and choosing the intensity of the deicing current and the circulation time of that current.

According to one embodiment, this method can also be implemented in an automated manner. In that case, the railway network alternatively comprises a control module able to decide that deicing is necessary and choose the value of the deicing current I and the circulation time of the current I, in particular from temperature measurements done by the temperature sensor (such as sensor 50 or 60), then to control each of the steps of the method listed above, so as to deice the power supply line.

The deicing method according to the invention has the advantage of not requiring that specific additional equipment be provided to deice the power supply line. In fact, the method according to the invention only uses the reversible substations, which are permanently present along the power supply line, since they are used to supply the supply line.

The method according to the invention is also particularly simple to carry out, since one need only select, depending on a desired deicing current, adapted output voltages of the converters of certain substations to obtain deicing of the power supply line between those substations.

The method according to the invention is also less expensive to carry out than the known deicing methods, since it does not require that trains be run all night, or that additional equipment be used.

Furthermore, this method is very safe to use, since it can be implemented remotely without needing maintenance staff at the segment itself.

According to one alternative of the converter 25, it is a two-quadrant converter.

In the preceding, operation in current supply mode corresponds to the operation in rectifier mode of the reversible substation 20A, 20B. The operation in current recovery mode corresponds to operation in inverter mode of the reversible substation 20A, 20B.

What is claimed is:

1. A method for deicing a direct current power supply line for railway vehicles, said line extending between at least a first and a second reversible substations able to supply an electrical current circulating on the electrical power supply line, the first substation being controlled in a current supply mode, to supply an electrical current to the electrical power supply line and the second substation being controlled in a current recovery mode, to recover the electrical current from the electrical power supply line and send it back on an electrical power supply network, the method comprising:
   establishing a voltage difference between the output terminals of the first and second substations such that a current circulates on the electrical power supply line between the first substation and the second substations and that the heat produced by the circulation of the current causes the deicing of the power supply line between the first and second substations.

2. The deicing method according to claim 1 further comprising:
   choosing and controlling the voltage difference between the output terminals of the first and second substations.

3. The deicing method according to claim 1, wherein the first substation and the second substation each comprises a reversible power converter, such that the first substation and the second substations are capable of operating in current supply mode or current recovery mode and in that the method further comprises controlling the operating mode of the first and second substations, in current supply mode and current recovery mode, respectively.

4. The deicing method according to claim 3, wherein the reversible power converter comprises a rectifier and an inverter, connected to the rectifier in anti-parallel, and in that the first or second substation operates in inverter mode when it is controlled in current recovery mode and in rectifier mode when it is controlled in current supply mode.

5. The deicing method according to claim 1, wherein each substation is connected to the power supply line and to a rail such that the current circulates in a loop passing successively through the substation controlled in current supply mode, then through the power supply line, then through the substation controlled in current recovery mode, then through the rail to return to the substation controlled in current supply mode.

6. The deicing method according to claim 1 further comprising measuring the temperature on or near the power supply line, the voltage difference being established if the measured temperature is below a pre-established threshold.

7. The deicing method according to claim 1 further comprising checking if a railway vehicle circulates between the substations, the voltage difference being established if no railway vehicle is circulating between the first and second substations.

8. The deicing method according to claim 1 further comprising:
- choosing two substations to be controlled in current supply mode and current recovery mode, respectively, and
- establishing a voltage difference between the output terminals of said substations depending on the segment of the line to be deiced when the power supply line extends between more than two substations.

\* \* \* \* \*